United States Patent [19]

Martinez

[11] Patent Number: 4,761,914
[45] Date of Patent: Aug. 9, 1988

[54] SYSTEM OF CONSTRUCTION OF TERRACED STRUCTURES FOR CROPS

[76] Inventor: Manuel T. Martinez, Sancho el Fuerte, 21-8° Navarra, Pamplona, Spain

[21] Appl. No.: 32,019

[22] Filed: Mar. 30, 1987

[30] Foreign Application Priority Data

Apr. 1, 1986 [ES] Spain .................................. 553.591

[51] Int. Cl.⁴ .............................................. A01G 9/02
[52] U.S. Cl. ............................................ 47/83; 47/33
[58] Field of Search ........................... 220/19; 52/222; 405/284, 286; 47/66, 82, 83, 78, 33

[56] References Cited

U.S. PATENT DOCUMENTS 2,837,866  6/1958  Esmarg et al. .......................... 47/83
4,449,857  5/1984  Davis .................................. 405/286

Primary Examiner—Robert E. Bagwill
Assistant Examiner—Bradley Lewis
Attorney, Agent, or Firm—Lucas & Just

[57] ABSTRACT

The system has two rigid and equal one-piece side frames that are tiered on both sides and are spaced apart by an upper stringer. There are at least two strap cables for each tier that embrace the entire perimeter.

6 Claims, 3 Drawing Sheets

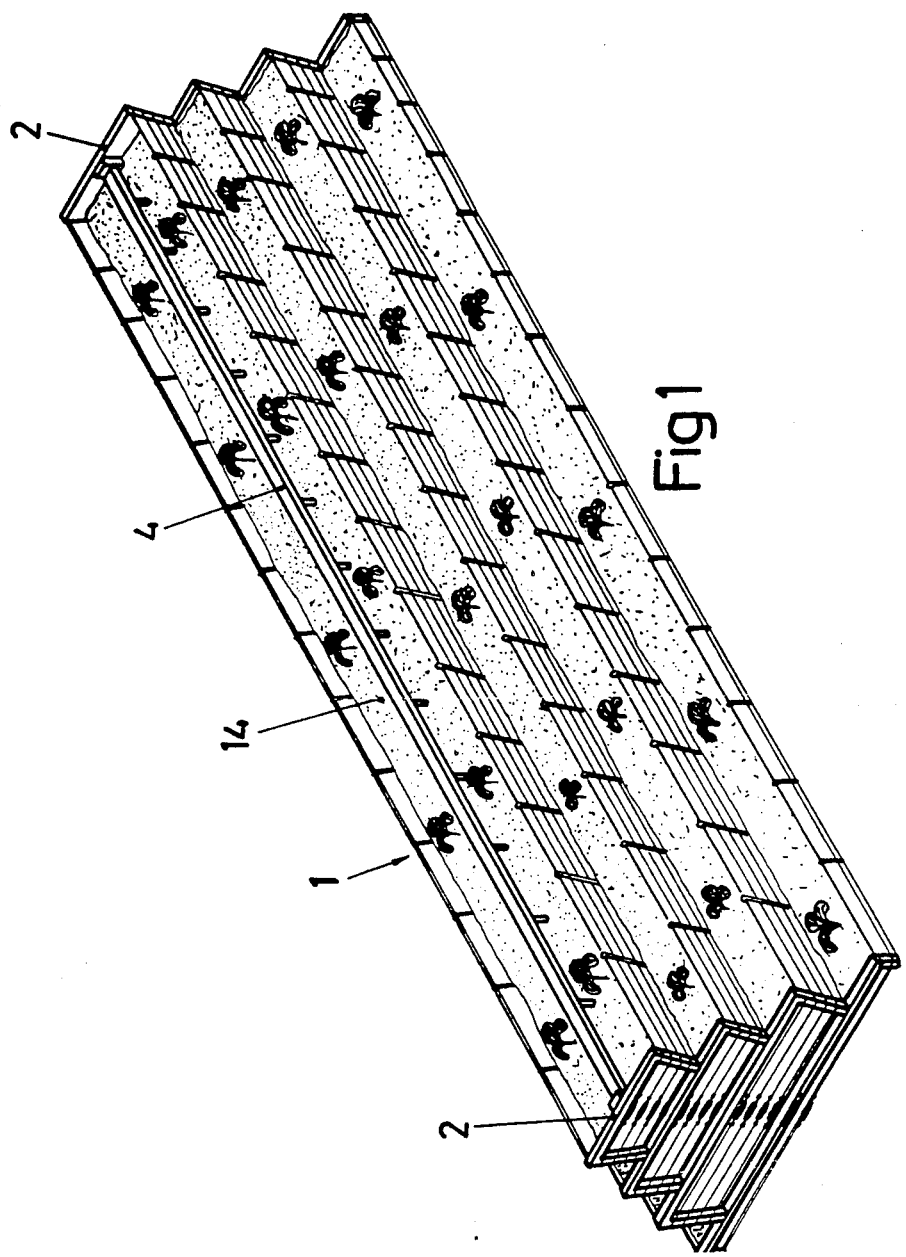

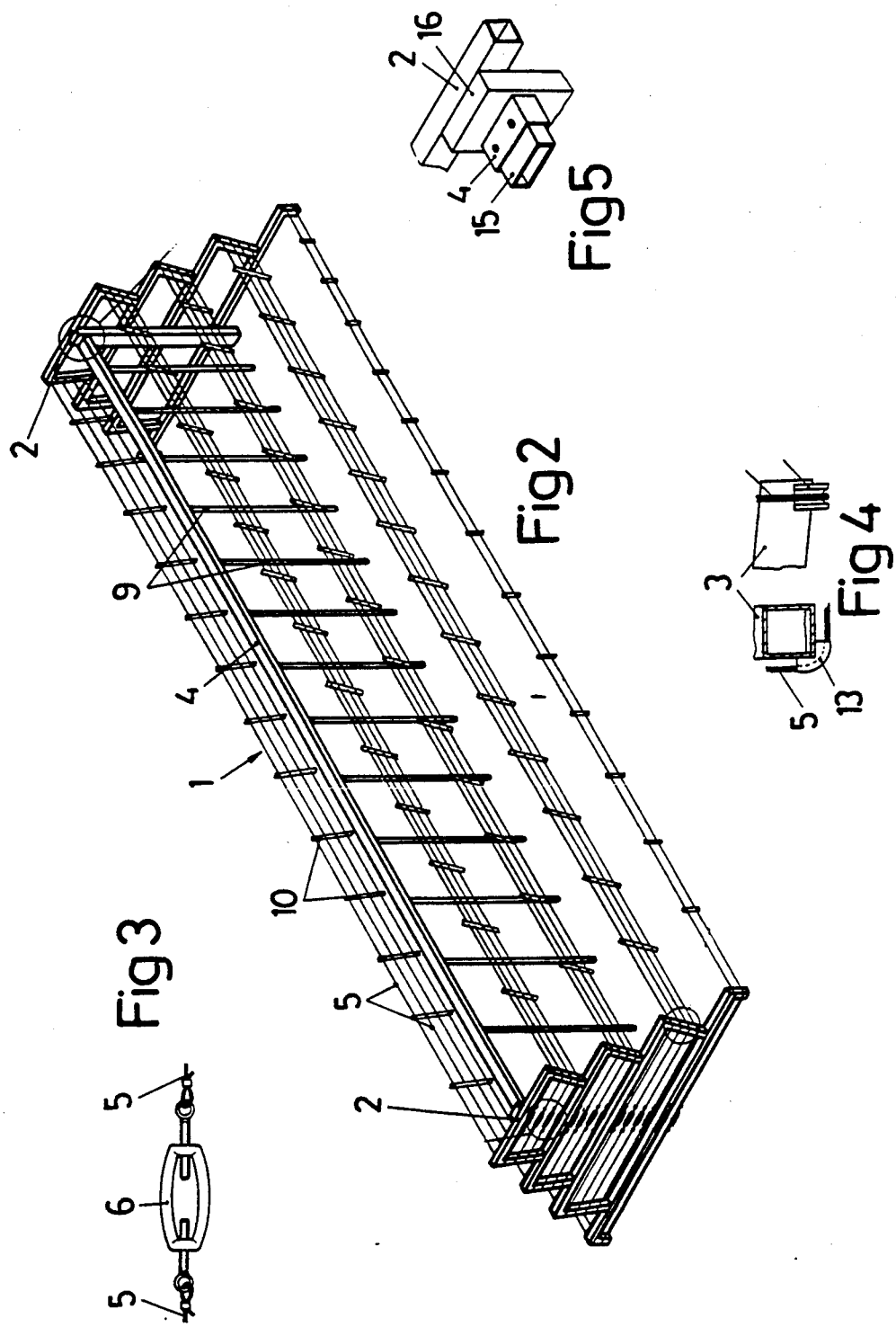

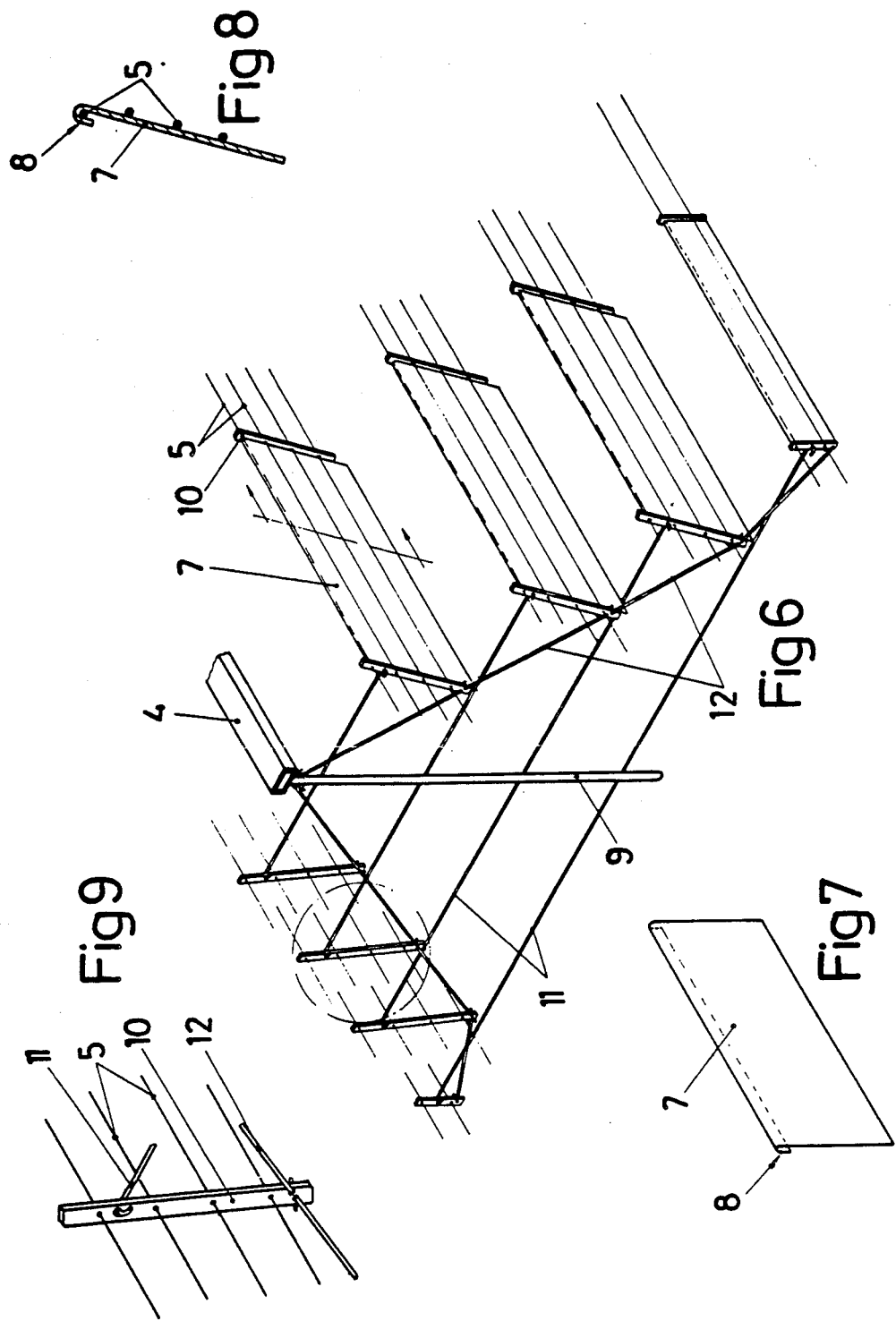

SYSTEM OF CONSTRUCTION OF TERRACED STRUCTURES FOR CROPS

The practice exists at present of growing crops in terraced structures, whether independent or not of the soil where they are located and which make available a cultivable surface greater than the area occupied on the soil.

These terraced structures are especially suitable for growing hothouse crops under maintained conditions of composition, moisture, temperature and aeration of the soil, since said structures can be equipped with the means necessary for achieving the conditions of the crop more easily than on soil situated in an open field.

The terraced structures known at present are specifically made for each need and an excessive number of parts is used in them, they are rather complex and they require a considerable job of assembly. The reason for making them that way is probably because these structures are built more with a view to obtaining a concrete crop than to rationalizing their construction.

However, this type of structure has wide acceptance for application to every type of crop, due to the favorable ratio between the area occupied by the structure and the growing surface it offers.

For that reason, the applicant for this patient has devised the object of the present invention, which consists of a new system of construction of terraced or tiered structures, combining simplicity, economy and versatility, without giving up any of the properties that known structures of this type possess.

Accordingly, the system recommended makes it possible to build expanded structures with tiers on both sides, using for same two end frames with a section in which the treads and risers of the side tiers take shape; the frames are connected on top by a stringer and on the sides by plates that constitute the risers of the tiers and are kept in that position with the cooperation of strap cables that contribute rigidity and stability to the structure.

As can be seen, this system of construction is simple to assemble and disassemble and uses extremely simple and economical parts, since they can be obtained directly from products on sale (cables, stringer) or by subjecting these products to simple operations of cutting and welding (frames) or bending (side plates).

When the structure is very long, the system recommended provides for the layout of braced posts, serving as support for the upper stringer, and the layout of flats that are crossed by the strap cables and keep the separation between said strap cables stable.

Together with structural simplicity and economy, the system recommended presents another important characteristic, which consists of the possibility of expanding at will according to a modular concept, making the separation between support points of the upper stringer correspond to the length of the side plates and providing on each transverse plane between two adjacent side plates the corresponding means of bracing and flats.

The indicated characteristics of the system of construction proposed include numerous advantages, among which the following deserve to be stressed:

Possibility of adapting to any dimensional requirement by merely varying the length of the upper stringer. It will solely be necessary to provide as many plates, posts, flats and bracing means as the total length of said structure may require.

The simplicity of assembly and disassembly combined with the absence of the need for special preparation of the soil make it possible to situate the crop at any time with the right orientation to guarantee a good number of hours of sunshine on the tiers on both sides of the structure.

Applicable for traditional crops, as well as for special crops, since the structure can be easily equipped with the means and devices necessary to achieve the required conditions of moisture, temperature, nutrients, etc. It can also be applied in hothouses.

Easily storable and movable because of the simplicity of its assembly and disassembly and because of the small space it occupies when disassembled.

Because of the system of placement of the side plates, each of them can be removed independently, making possible partial repairs of interior irrigation and heating pipes, when it is a question of special crops incorporating these elements.

The arrangement of tiers on both sides and driving of the lower edges of the side plates into the soil make it possible for the own weight of the soil contained to cooperate in its stability, and therefore, with a small resistant structure, make available a large surface of arable soil.

To understand the nature of the invention better, we represent on the attached plans (merely by way of illustrative and non-limitative example) a preferred industrial embodiment, to which we refer in our description, on said plans.

FIG. 1 is a view in perspective of a tiered structure (1) made in accordance with the invention and loaded with arable soil (14).

FIG. 2 is a view is perspective of a structure (1) made in accordance with the invention, in which, for sake of greater clarity, the retaining side plates (7) are not represented. The three details that are represented enlarged on FIGS. 3, 4 and 5 are indicated there in circles.

FIG. 3 represents the enlarged detail of FIG. 2 corresponding to the tension member (6) of a strap cable (5).

FIG. 4 represents a plan view and a side view of a portion of a riser (3) of the frame (2); these views correspond to the enlarged detail of FIG. 2, pertaining to the channeled projection (13) on which the cable (5) slides.

FIG. 5 represents the enlarged detail of FIG. 2 showing a preferred embodiment of a coupling between the upper stringer (4) and the frames (2).

FIG. 6 is a view in perspective of a cross section of a structure (1) according to the invention; on the right side of the figure the representation of the side plates (7) has been completed and on one of these side plates (7) there is a section marker in accordance with which FIG. 8 has been made, enlarging said section for sake of greater clarity.

FIG. 7 is a view in perspective of one of the side plates (7).

FIG. 8 is an enlarged view made along the section indicated in FIG. 6 and clearly showing the position of a side plate (7) in relation to the strap cables (5).

FIG. 9 is an enlarged view of the detail indicated in FIG. 6 and pertaining to the position of a separating flat (10) in relation to the strap cables (5) and horizontal tie rods (11) and oblique bars (12).

The following features are shown on them:
1. Structure
2. Frame
3. Riser
4. Upper stringer 5. Strap cable
6. Tension member
7. Side plate
8. Hooked edge of the plate (7)
9. Post
10. Separating flat
11. Horizontal tie rod
12. Oblique bar
13. Channeled projection
14. Arable soil
15. Flange
16. Base The invention recommended is a system of construction of tiered structures (1) for crops, which can be applied, as shown, for merely illustrative purposes, in FIG. 1, after having been loaded with arable soil (14).

FIG. 2 shows in outline the structure (1) represented on FIG. 1 and corresponding to an embodiment of fourteen modules. As can be appreciated on this FIG. 2, the system of construction recommended consists basically of two rigid and equal one-piece tubular frames (2) that are joined by an upper stringer (4), also tubular, which is what determines the length of the structure (1); the frames (2) determine the general section of the structure (1) and present two sides converging upward and shaped with steps, the upright member or tread (3) of which is directed outward from the structure (1).

The sidewalls of the structure (1) are constituted by means of side retaining walls (7) that are situated between both frames (2), following the inclination of the treads (3). These side plates (7) are held in position by at least two strap cables (5) that embrace the structure (1) along horizontal planes; these strap cables (5) are provided with tension members (6) (see FIG. 3) that gives them sufficient tensile strength to impart adequate rigidity and stability to the structure (1), in addition to maintaining the plates (7) in position.

Bearing in mind that, within the scope of the invention, various solutions may be adopted, preferred working details are shown on FIGS. 4 and 5, which complete the basic structure (1) described. FIG. 4 shows one of the channeled projections (13) that will exists for each cable (5) at each of the sharp edges on which said cable (5) is to be supported on embracing the structure; these channeled projections (13) are intended to promote sliding of the cable (5) by acting on the tension member (6) and preventing fortuitous vertical displacements. FIG. 5 shows the coupling between the supper stringer (4) and the frames (2), which consists of the fact that the stringer (4) receives at its end a horizontal flange (15) that belongs to a vertical base (16) integrated with each frame (2), fastening being produced between said stringer (4) and flange (15) through riveting, screwing or other known means making subsequent disassembly possible.

The side plates (7) present at the top a hooked edge (8) that opens downward (see FIGS. 7 and 8) forming a sufficient housing to receive the cable (5). That enables the side plates (7) to be laid by an extremely simple procedure, which consists of situating the plate (7) between the two upper cables (5) of the same tread (3) and advancing it from outside to inside until the plate (7) is suspended from the higher cable (5) of the two by the hooked edge (8) and laterally supported on the cable or cables (5) situated underneath (see FIG. 8), which will adequately support said plates (7) in order to retain the pressure of the soil (14). This retention will be favored by having the lower part of the plates (7) buried in the lower step or tier. In any event, this burial will not prevent the removal of one or more plates without difficulty, when necessary.

At this point it is advisable to reflect on the simplicity and economy allowed by the system recommended by making possible the building of the structure (1) with elements as simple, cheap and easy to obtain as square ducts, cables and plates, which it is only necessary to submit to simple cutting, welding or bending operations.

When it is necessary to build structures of great length, this invention provides for the layout of posts (9), flats (10) and bracing means (11 and 12) as simple in design as the rest of the elements and making possible a modular type configuration that is adaptable to any need.

As can be seen on FIGS. 2 and 6, the layout consists of situating the posts (9) supporting the stringer (5) by a distance apart equal to the length of the plates (7) and locating between each two adjacent plates (7) a flat (10) that is crossed by the cables (5) (see FIG. 9), making them maintain their preestablished separation; the bracing means are, on the one hand, horizontal tie rods (11) that link together flats (10) of the same tier and transverse plane of the structure (1) and, on the other, oblique bars (12) that connect the lower ends of flats (10) of the same side and transverse plane of the structure (1) belonging to successive tiers and with the exception of the bars (12) of the upper tier that place its upper end on the post (9) of the same transverse plane of the structure (1), with all of which transverse planes of great solidity and stability and separating adjacent modules are defined in said structure (1).

If the length of the structure (1) is adaptable to any need, the same thing occurs with the width and height of same, since for that purpose it will be sufficient to give the frames (2), posts (9) and bracing means the right dimensions, which involves no problem, given the simplicity of these elements.

The nature of this invention, as well as its industrial application, having been sufficiently described, it only remains to be added that it is possible to introduce changes in shape, material and layout of the structure and its components, without departing from the scope of the invention, as long as such alterations do not modify its principle.

I claim:

1. System of construction of terraced structures for crops, comprising two rigid and equal one-piece frames that will determine the shape of the general cultivating structure and tiered on both sides with upward convergence, and in which each said tier has its tread or upright member inclined outward; both said frames being joined by an upper stringer that determines the length of the general structure and at least two strap cables existing on each said tread, each said strap cable forming a link embracing the entire perimeter of the terraced structure and incorporating means of stress, in order to keep the link under tension, and side walls being constituted by a plurality of side retaining plates, having as many side retaining plates as there are tiers, said side retaining plates are provided with a means of hooking on the upper strap cable and are abutted and supported laterally against said cables around said tier and in alignment with the tread; and when the structure is very long, there will be braced posts to support said upper stringer at intermediate points and flats that are crossed by said strap cables and keep the separation between said cables stable.

2. System of construction of terraced structures for crops, in accordance with claim 1, characterized in that said posts supporting said upper stringer are spaced at the same distance as the length of said side retaining plate and each said post is situated on the same transverse planes said separating flats between every two plates and as said bracing means, so that the structure can be modularly expanded at will by means of the layout of said upper stringer of the required length and the addition of said supporting posts, retaining plates, separating flats and bracing means necessary for the expansion intended.

3. System of construction of terraced structures for crops, in accordance with claim 1, characterized in that said bracing means consist, of horizontal tie rods that extend between the upper ends of said flats of the same tier and transverse plane of said terraced structure belonging to opposite sides and, oblique bars that connect the lower ends of said flats of the same side and transverse plane of the said terraced structure belonging to two successive tiers of the same side, with the sole exception of said oblique bars corresponding to the highest tier, which said oblique bars locate their upper end on said post of the same transverse plane of said terraced structure.

4. System of construction of terraced structure for crops, in accordance with claim 1, characterized in that said retaining plates present their upper hooked edges in order for placement with respect to said strap cables said terraced plates being placed by means of the insertion of same between said upper cable and said next lower cable, until said upper cable is grabbed by the hooked edge, at which time said terraced plate is suspended from said upper cable and supported on said lower cable or cables in a position to retain the load of said terraced structure.

5. System of construction of terraced structures for crops, in accordance with claim 1, characterized in that at said upright members of said frames and on the sharp edges with respect to said strap cables, there is a channeled projection for each said strap cable that facilitates sliding for stretching of the said strap cable and that prevents the latter from undergoing fortuitous vertical displacements.

6. System of construction of terraced structures for crops, in accordance with claim 1, characterized in that the height of said retaining plates is such that on loading the structure the lower edges are buried in said lower tier, which contributes to the more efficient work of said plates, but does not, however, prevent the removal of one or more plates at a given time without too much effort.

* * * * *

UNITED STATES PATENT AND TRADEMARK OFFICE
CERTIFICATE OF CORRECTION

PATENT NO. : 4,761,914
DATED : August 9, 1988
INVENTOR(S) : Manuel Torres Martinez It is certified that error appears in the above-identified patent and that said Letters Patent are hereby corrected as shown below:

Column 1, line 27, change "patient" to --patent--.

Column 5, line 8, after "planes", insert --as--.

Column 6, line 1, change "structure" to --structures--.

Column 6, line 5, change "terraced" to --retaining--.

Column 6, line 8, delete "terraced".

Signed and Sealed this

Sixth Day of December, 1988

Attest:

DONALD J. QUIGG

Attesting Officer    Commissioner of Patents and Trademarks